United States Patent
Dierks et al.

(10) Patent No.: US 9,315,138 B1
(45) Date of Patent: Apr. 19, 2016

(54) HYDRAULIC TAIL TRAILER

(71) Applicants: Dale J. Dierks, Mitchell, SD (US);
Donald Huber, Alexandria, SD (US);
Brent Hohman, Fulton, SD (US);
Brandon Bjerrum, Sioux Falls, SD (US)

(72) Inventors: Dale J. Dierks, Mitchell, SD (US);
Donald Huber, Alexandria, SD (US);
Brent Hohman, Fulton, SD (US);
Brandon Bjerrum, Sioux Falls, SD (US)

(73) Assignee: DAKOTA MANUFACTURING COMPANY, INC., Mitchell, SD (US)

( * ) Notice: Subject to any disclaimer, the term of this patent is extended or adjusted under 35 U.S.C. 154(b) by 184 days.

(21) Appl. No.: 14/146,439

(22) Filed: Jan. 2, 2014

(51) Int. Cl.
*B60P 1/43* (2006.01)

(52) U.S. Cl.
CPC ........................................ *B60P 1/43* (2013.01)

(58) Field of Classification Search
CPC .................................... B60P 1/08; B60P 1/43
USPC ........................................................ 414/475
See application file for complete search history.

(56) References Cited

U.S. PATENT DOCUMENTS

| | | | | |
|---|---|---|---|---|
| 2,566,556 A * | 9/1951 | Cunningham | ............ | B60P 1/08 298/20 R |
| 3,191,966 A * | 6/1965 | Felburn | ................ | B62D 53/068 280/407 |
| 3,208,615 A * | 9/1965 | Wolf | ...................... | B60P 1/6454 280/43.18 |
| 3,410,576 A * | 11/1968 | Turpen | .................. | B60P 1/6427 280/418.1 |
| 3,987,919 A * | 10/1976 | Weeks | ....................... | B60P 1/08 280/149.2 |
| 4,111,451 A * | 9/1978 | Pinto | ..................... | B60P 1/6427 280/408 |
| 4,132,326 A * | 1/1979 | Pinto | ..................... | B60P 1/6418 280/149.1 |
| 4,806,061 A * | 2/1989 | Fenton | ...................... | B60P 1/52 280/149.2 |
| 5,013,056 A | 5/1991 | Landoll et al. | | |
| 5,215,426 A | 6/1993 | Bills, Jr. | | |
| 7,547,178 B1 | 6/2009 | Dierks et al. | | |
| 7,658,587 B1 | 2/2010 | Dierks et al. | | |
| 8,573,915 B2 | 11/2013 | Dierks et al. | | |

\* cited by examiner

*Primary Examiner* — Jonathan Snelting
(74) *Attorney, Agent, or Firm* — Dennis L. Thomte; Thomte Patent Law Office LLC (57) ABSTRACT

A hydraulic tail trailer comprising a main deck having a main tail assembly pivotally connected to the rearward end thereof with the pivotal connection therebetween being located forwardly of the centerline of the rear axle of the trailer suspension system. The location of the hinge between the main deck and the main tail assembly, by being located forwardly of the centerline of the rear axle, provides a main tail having an increased length thereby providing a lower loading angle without increasing the overall length of the trailer. The trailer of this invention also enables the front axles of the trailer suspension system to be moved to multiple spread positions with respect to the rear axle.

1 Claim, 11 Drawing Sheets

HYDRAULIC TAIL TRAILER

BACKGROUND OF THE INVENTION

1. Field of the Invention

This invention relates to a hydraulic tail trailer including a front axle supported on a front suspension system and a rear axle supported on a fixed rear suspension system and more particularly to a hydraulic tail trailer wherein the main tail thereof is hingedly connected to the trailer frame forward of the centerline of the rear axle. Even more particularly, this invention relates to a hydraulic tail trailer wherein the front axle thereof is selectively longitudinally movable to multiple positions with respect to the fixed rear axle to enable the trailer to carry additional weight as the spacing of the front axle with respect to the rear axle is increased.

2. Description of the Related Art

The trailer transportation of heavy or large farm and industrial equipment requires special loading ramps at the rear end of the trailer. A typical hydraulic tail trailer of the prior art includes a rear axle supported on a rear suspension system and a front axle supported on a front suspension system. The rear axle and rear suspension system is sometimes referred to as a rear running gear assembly. The front axle and front suspension system is sometimes referred to as a front running gear assembly. In most prior art trailers, the rear and front suspension systems are longitudinally fixed to the trailer frame such as shown in U.S. Pat. No. 7,547,178 which is owned by the assignee of the instant invention. In some cases, both the rear and front suspension systems are slidably mounted, as a unit, on the trailer frame such as shown in U.S. Pat. No. 5,013,056. In other prior art trailers, the rear axle may be moved forwardly on the trailer frame for unloading and loading purposes only such as disclosed in U.S. Pat. No. 5,215,426 which is also owned by the assignee of the instant invention.

In U.S. Pat. No. 7,547,178, the location of the hinge between the main deck and the main tail assembly is located forwardly of the centerline of the rear axle to provide a main tail having an increased length thereby providing a lower loading and unloading angle without increasing the overall length of the trailer. However, in U.S. Pat. No. 7,547,178, the spacing of the rear and front axles is fixed. Thus, the weight which may be legally carried by the trailer of U.S. Pat. No. 7,547,178 is fixed and cannot be increased since axle spacing determines the weight which may be legally carried by a trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A hydraulic tail trailer is disclosed which includes a main frame having forward and rearward ends with the main frame including at least first and second longitudinally extending side frame members. Longitudinally extending first and second running gear beams, having forward and rearward ends and upper and lower ends, are secured to the main frame in a fixed non-movable manner. Each of the first and second running gear beams have rearwardly extending portions which extend rearwardly from the rearward end of the main frame. The trailer also includes front and rear axles having first and second ends with wheels being secured to the first and second ends of the front and rear axles. A front suspension assembly selectively longitudinally adjustably secures the front axle to the first and second running gear beams forwardly of the rearward end of the main frame in multiple longitudinal positions with respect to the main frame. A rear suspension assembly secures the rear axle to the first and second running gear beams rearwardly of the rearward end of the main frame in a single longitudinal non-movable position.

A main deck is mounted on the main frame and has forward and rearward ends. The rearward end of the main deck is positioned forwardly of the centerline of the rear axle and is positioned rearwardly of the centerline of the front axle. The trailer also includes a hydraulically operated tail assembly, having forward and rearward ends, with the forward end of the tail assembly being pivotally secured to the main deck at the rearward end of the main deck. The pivotal connection of the forward end of the tail assembly to the rearward end of the main deck is positioned forwardly of the centerline of the rear axle and is positioned rearwardly of the front axle in all of the multiple positions of the front axle. The front axle is selectively longitudinally movable to multi-positions to increase or decrease the spacing between the front and rear axles thereby enabling the legal carrying weight of the trailer to be increased by increasing the spacing between the front and rear axles.

In the preferred embodiment a front axle brake is operatively coupled to the wheels on the front axle and a rear axle brake is operatively coupled to the wheels on the rear axle with the front and rear axle brakes being independently operable. In the preferred embodiment, the tail assembly includes a main tail, having a rearward end, a forward end, an upper end, and a lower end. The tail assembly further includes a flip tail, having a rearward end, a forward end, and a lower end, with the forward end of the flip tail being pivotally secured to the rearward end of the main tail. The flip tail is selectively movable from a stowed position beneath the main tail to a position wherein the flip tail is parallel to the main tail.

It is therefore a principal object of the invention to provide an improved hydraulic tail trailer.

A further object of the invention is to provide an improved hydraulic tail trailer which includes front and rear axles with the front axle being selectively longitudinally movable to multiple positions to enable the spacing between the front and rear axles to be increased thereby increasing the legal carrying weight of trailer.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The hydraulic tail trailer of this invention is referred to generally by the reference numeral 10 and includes a forward end 12 and a rearward end 14. Trailer 10 may include a conventional upper deck section 16 and a hydraulically operated upper deck ramp 18 of conventional design. A king pin 20 is provided at the underside of the forward end of the trailer to enable the trailer to be connected to a prime mover such as a truck having a fifth wheel assembly mounted thereon.

Figure 1:
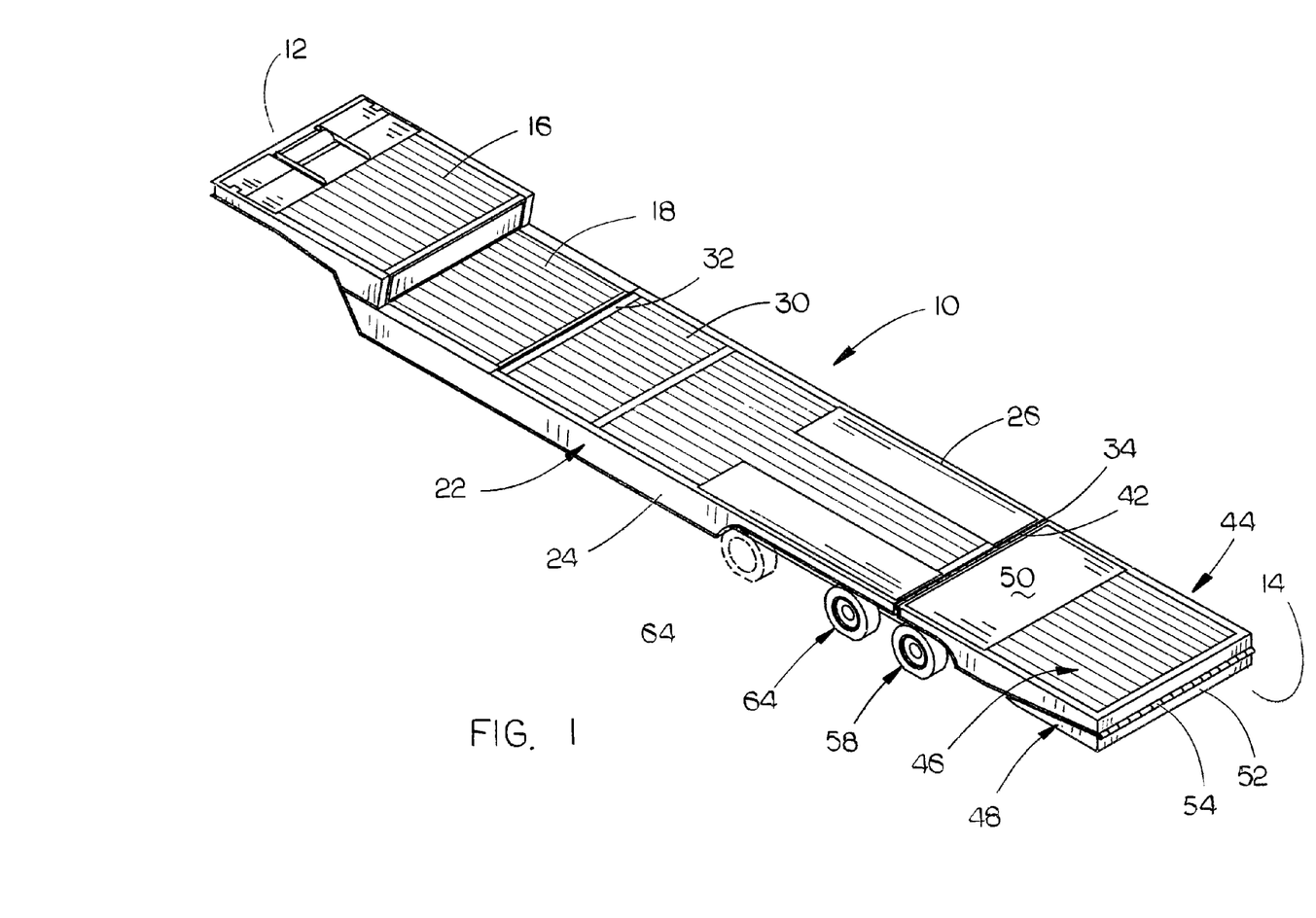
FIG. 1 is a rear perspective view of the trailer of this invention with the broken lines illustrating a position to which the wheels on the front axle may be positioned.
Figure 2:
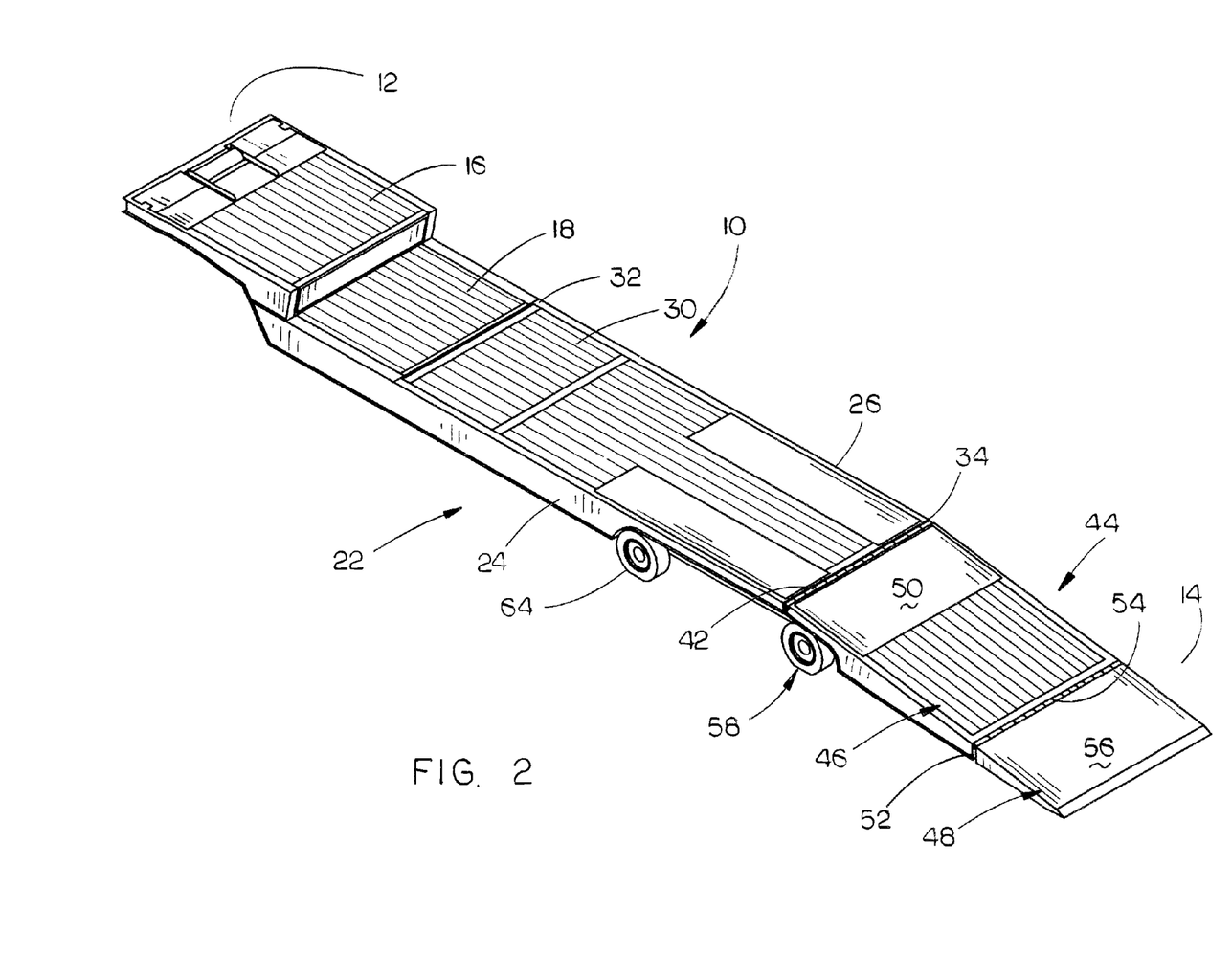
FIG. 2 is a perspective view of the trailer of this invention which illustrates the front axle thereof being in its forwardmost position with the tail assembly being in its extended loading and unloading position.
Figure 3:
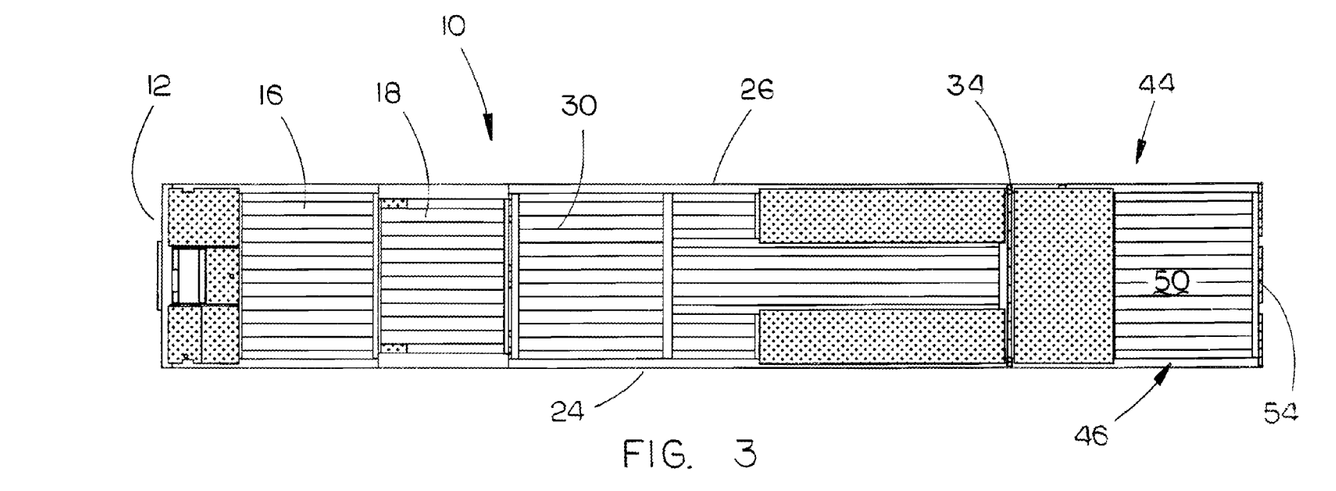
FIG. 3 is a top view of the trailer of FIG. 1.
Figure 4:
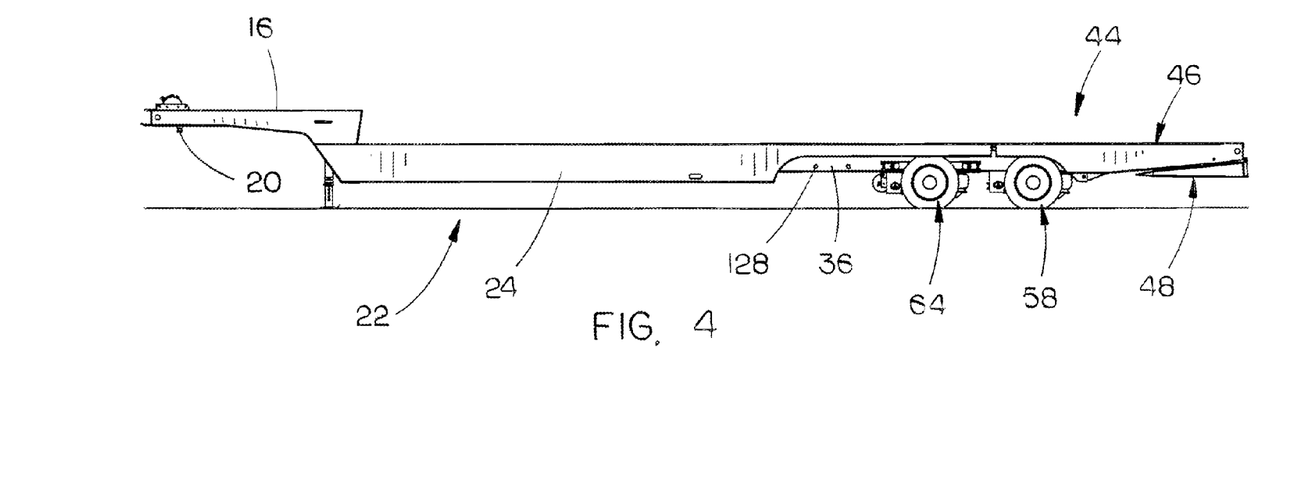
FIG. 4 is a side view of the trailer of FIG. 1 with the front axle being in its rearwardmost position.
Figure 5:
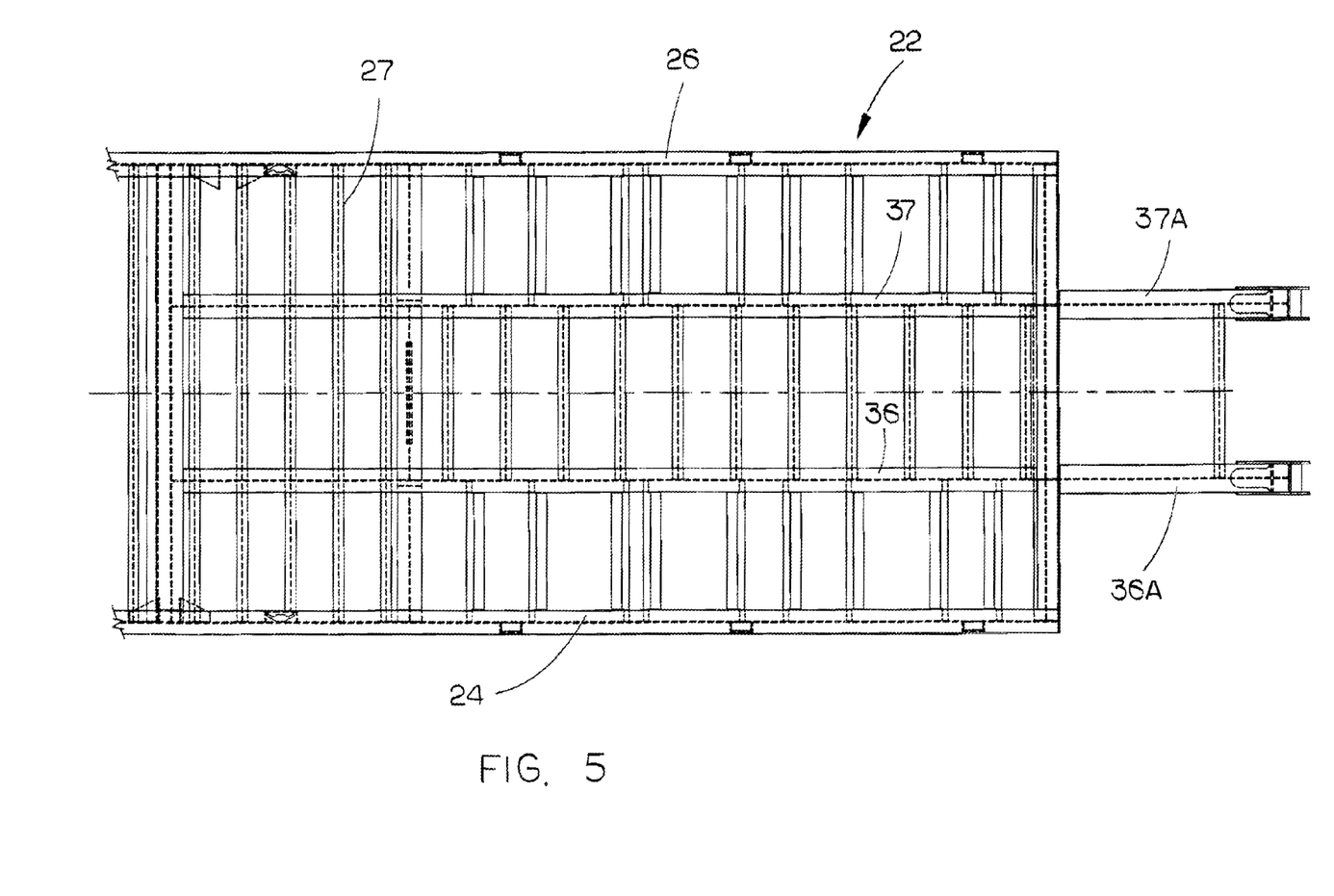
FIG. 5 is a partial top view of the main frame and running gear beams of the trailer of this invention.
Figure 6:
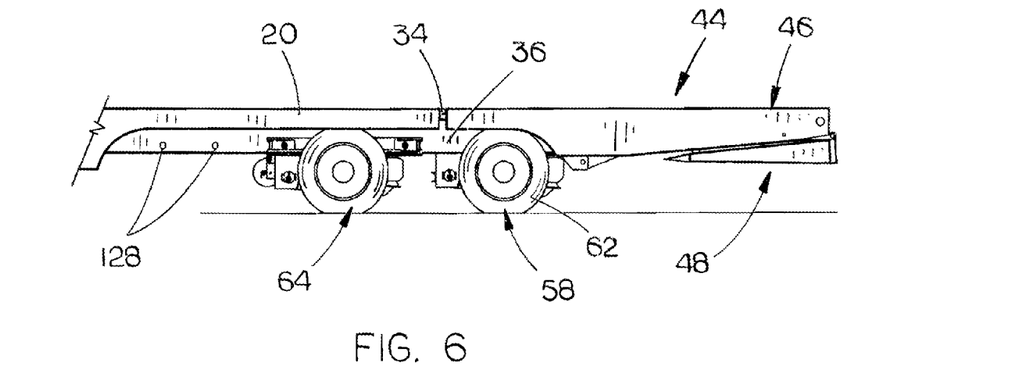
FIG. 6 is a partial side view illustrating the tail assembly in its horizontally disposed position and with the front axle of the trailer being in its rearwardmost position.

Trailer 10 includes a wheeled frame means 22 having first and second main frame beams 24 and 26 which are interconnected by cross-members 27 in conventional fashion such as shown in U.S. Pat. No. 7,547,178, which issued on Jun. 16, 2009 the disclosure of which is incorporated by reference thereto to complete this disclosure if necessary. The numeral 30 refers to a main deck which is supported upon the main frame beams 24, 26 and the cross-members extending therebetween with the main deck 30 having a forward end 32 and a rearward end 34 (FIGS. 1 and 2). A pair of longitudinally extending and horizontally spaced-apart running gear beams 36 and 37 are secured to the frame means 22 between the main frame beams 24 and 26 with each of the beams 36 and 37 having rearwardly extending portions 36A and 37A. Each of the running gears 36 and 37 are provided with a step or shoulder 41 at the forward ends of the rearwardly extending portions 36A and 37A to accommodate a hinge 42.

Figure 10:
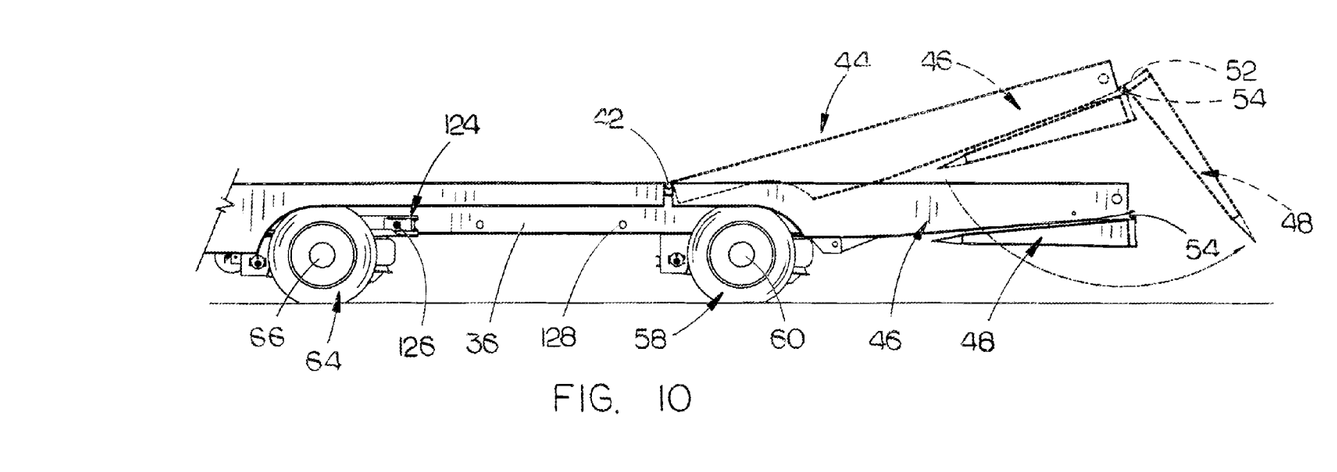
FIG. 10 is a partial side view illustrating the manner in which the tail assembly is operated.
Figure 11:
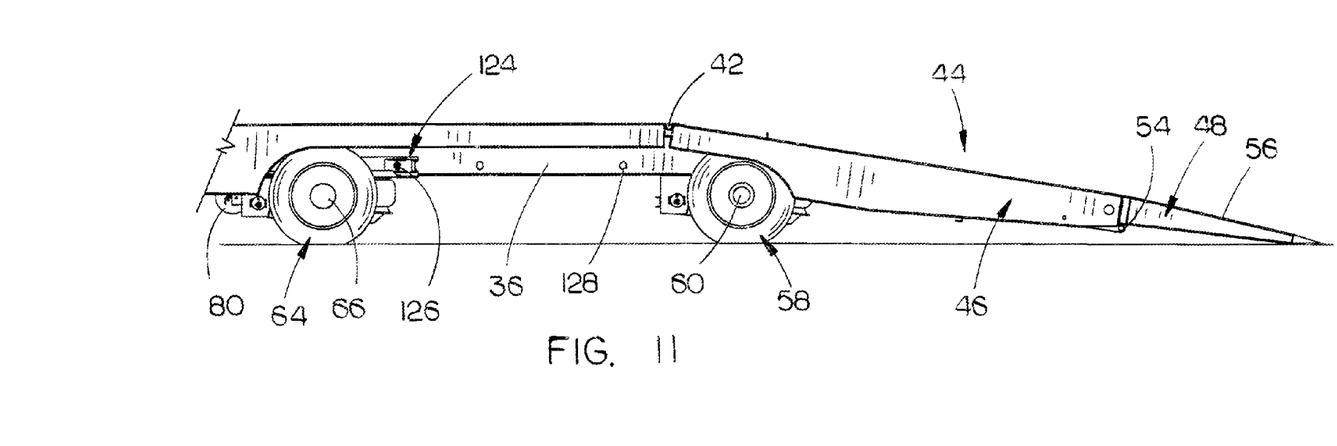
FIG. 11 is a view similar to FIG. 10 except that the tail assembly is in its extended loading and unloading position.

The numeral 44 refers to a hydraulic tail assembly, as disclosed in U.S. Pat. No. 7,547,178, which is pivotally secured to the rearward end of main deck 30 by hinge 42 and which includes a main tail 46 and a flip tail 48. Main tail 46 is provided with a deck 50 positioned thereon. The rod ends of hydraulic cylinders (not shown) are pivotally connected to the underside of main tail 46 for moving the main tail 46 from its load carrying position (FIG. 1) wherein the deck 50 is parallel to main deck 30 to a second position wherein main tail 46 extends upwardly and rearwardly from main deck 30 (FIG. 10) to a third position wherein main tail 46 extends downwardly and rearwardly relative to main deck 30 (FIG. 2).

Rip tail 48 is hingedly connected at its forward end 52 to the lower rearward end of main tail 46 by hinge 54. A hydraulic cylinder (not shown) is pivotally connected to and extends between the main tail 46 and flip tail 48 for pivotally moving flip tail 48 from a stowed position beneath the rearward end of main tail 46 (FIG. 1) to an operative position so that the upper deck surface 56 of flip tail 48 is parallel to and in alignment with the deck 50 of main tail 46, as disclosed in U.S. Pat. No. 7,547,178. Generally conventional locking means is provided for maintaining flip tail 48 in its stowed position (FIG. 1). Further, means is provided for maintaining main tail 46 in its load carrying position of FIG. 1, as disclosed in U.S. Pat. No. 7,547,148.

The numeral 58 refers to the rear suspension system of this invention which is the same as disclosed in U.S. Pat. No. 7,547,178. Rear suspension system 58 is fixedly secured to the rearward end portions 36A and 37A of running gear beams 36 and 37 respectively. Rear suspension system 58 includes a rear axle 60 having wheels 62 secured to the opposite ends thereof. Rear axle 60 is positioned rearwardly of the forward end of main tail 46. A conventional brake system is connected to the rear suspension system 58 for braking the wheels 62.

The numeral 64 refers to the front suspension system of this invention which is selectively longitudinally movably secured to the running gear beams 36 and 37 forwardly of the rearward end of main deck 30. Front suspension system 64 includes a front axle 66 having wheels 68 secured to the outer ends thereof. System 64 includes horizontally disposed and generally rectangular frame 70 having a forward end 72, a rearward end 74, and sides 76 and 78. An air tank 80 is mounted on the forward end of frame 70 which is in communication with a source of pressurized air. An elongated and longitudinally extending slider frame member 82 is mounted on frame 70 at side 76. An elongated and longitudinally extending slider frame member 84 is mounted on frame 70 at side 78.

Figure 12:
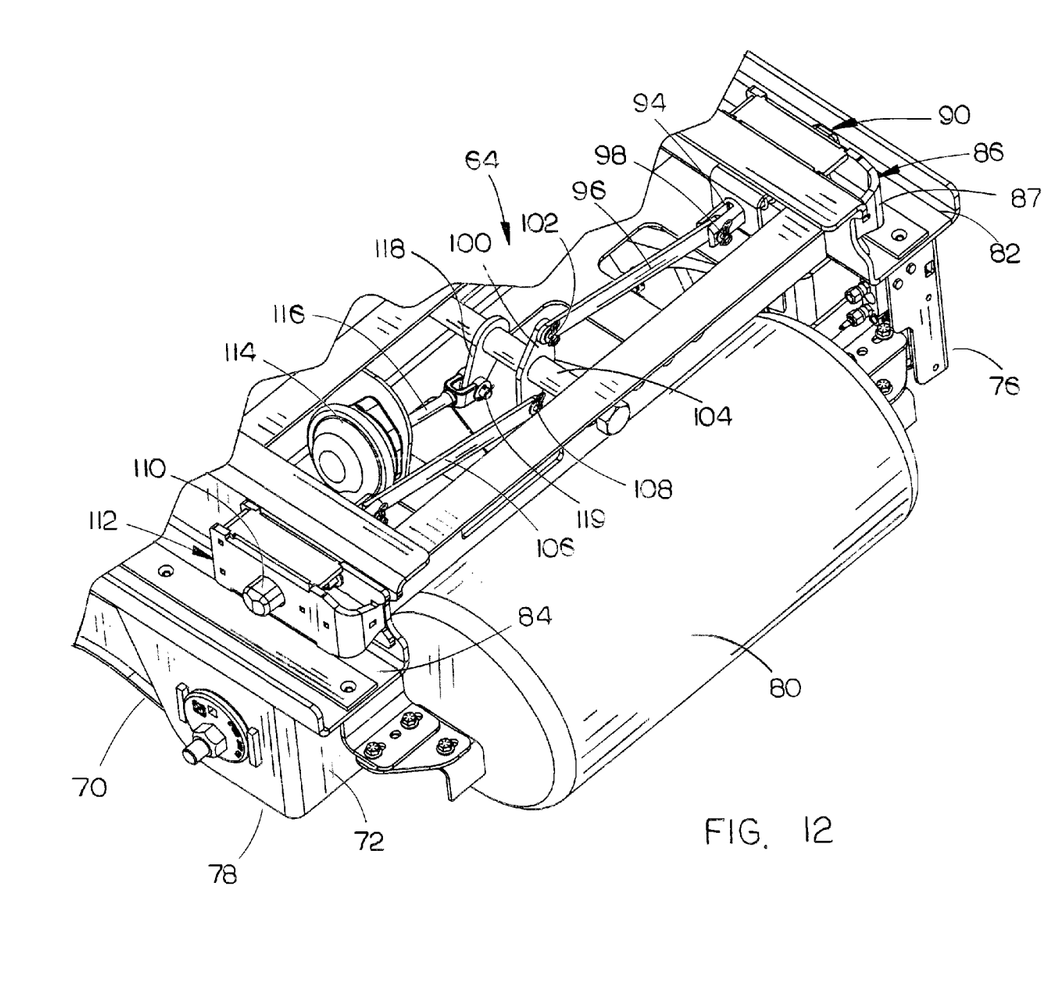
FIG. 12 is a partial front perspective view of the air operated locking means which is associated with the front axle suspension system of this invention.
Figure 13:
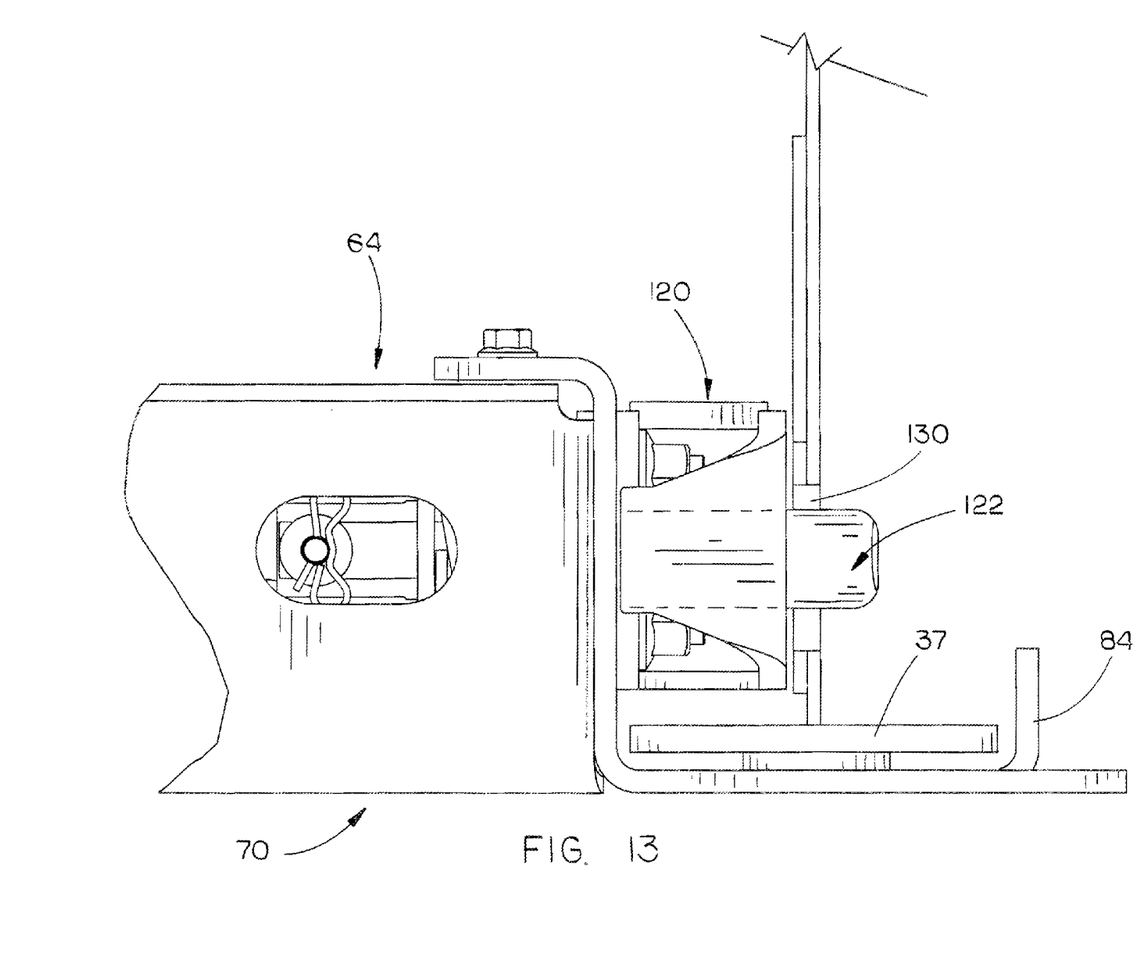
FIG. 13 is a partial end view of one of the locking pin assemblies of this invention.
Figure 14:
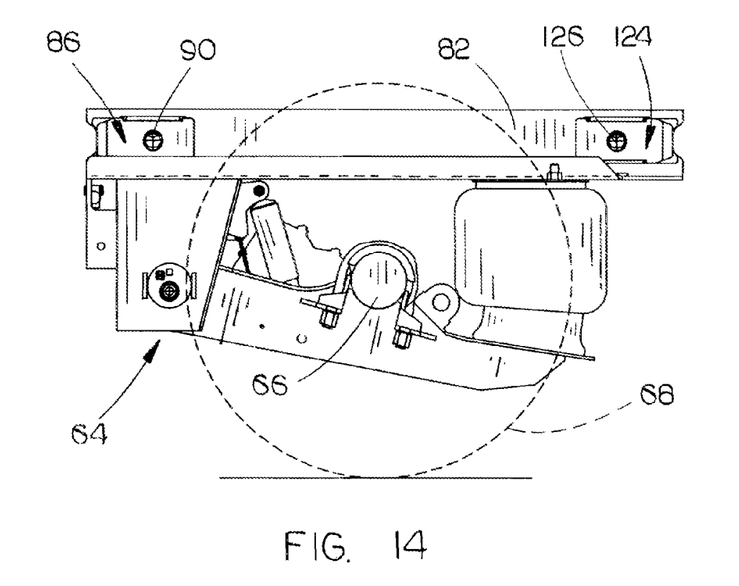
FIG. 14 is a partial side view illustrating the manner in which the front axle suspension system is secured to one of the running gear beams of the trailer.
Figure 15:
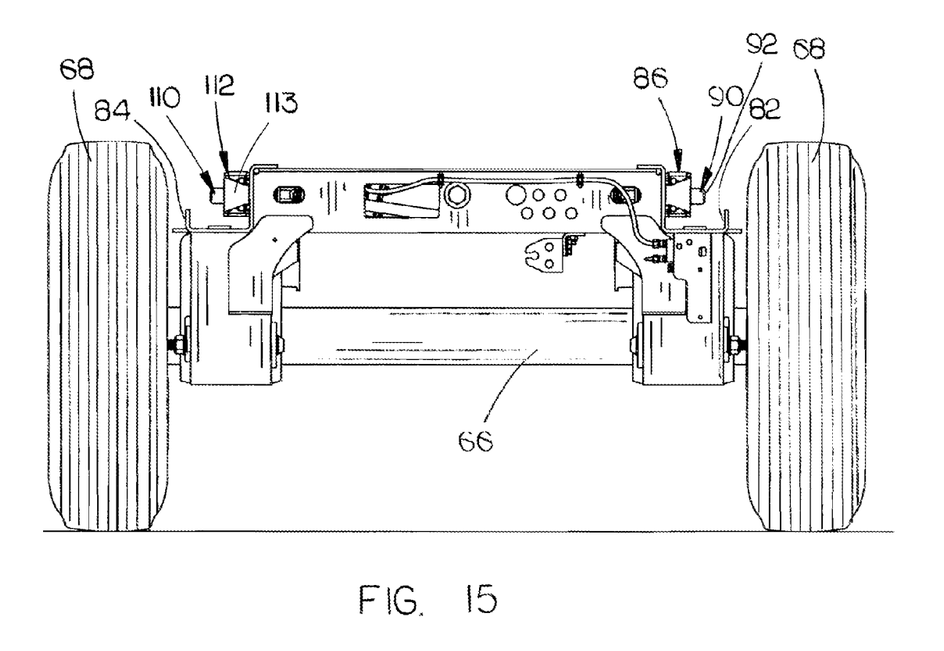
FIG. 15 is a partial front view of the front axle suspension system and the front axle.
Figure 16:
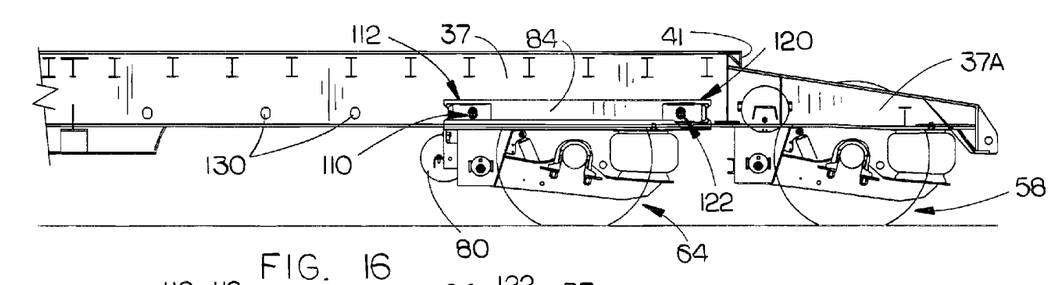
FIG. 16 is a partial center line sectional view of one of the running gear beams with front and rear suspension systems secured thereto.
Figure 17:
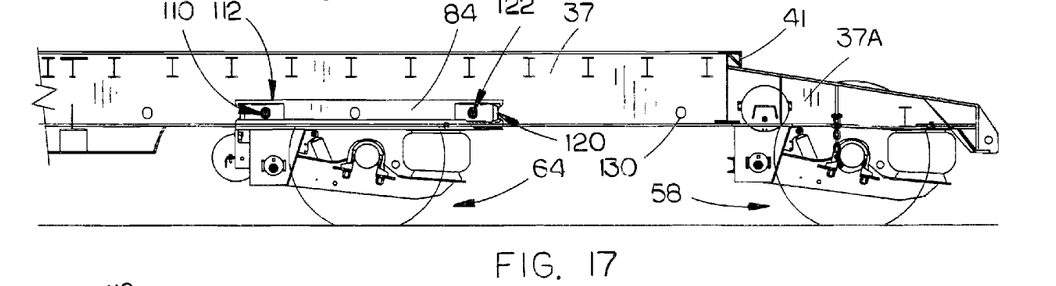
FIG. 17 is a view similar to FIG. 16 except that the front suspension system has been moved forwardly with respect to the rear suspension system.
Figure 18:
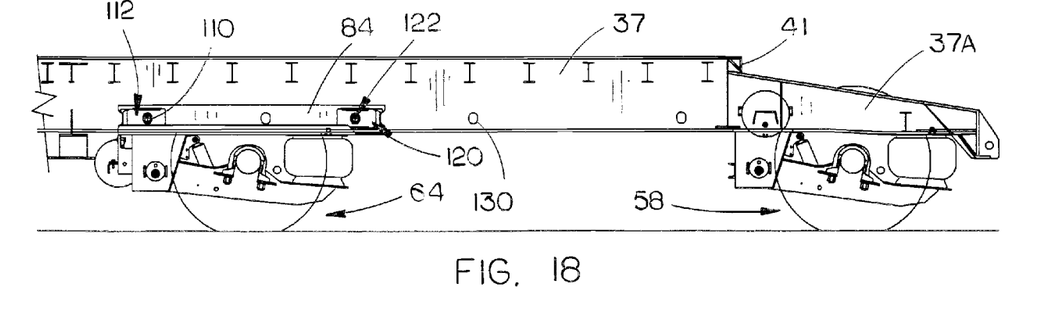
FIG. 18 is a view similar to FIG. 17 except that the front suspension system has been moved forwardly from the position of FIG. 17.

Frame 70 has a pin support 86 mounted on the side of slider frame member 82. Pin support 86 includes a pin cage 87 positioned therein with the pin cage 87 having a horizontally extending bore extending therethrough. An elongated locking pin 90 is horizontally slidably movably received in the bore formed in pin cage 87 and has an outer end 92 and an inner end 94. The inner end 94 of pin 90 has the outer end of an elongated link 96 pivotally secured thereto by bolt or pin 98. The inner end of link 96 is pivotally secured to one end of crank arm 100 by bolt or pin 102. Crank arm 100 is mounted on a rotatable shaft 104, as seen in FIG. 12. The other end of crank arm 100 has an elongated link 106 pivotally secured thereto by bolt or pin 108. The outer end of link 106 is pivotally secured to the inner end of locking pin 110 which is selectively horizontally movably mounted in pin support 112. Pin support 112 is the mirror image of pin support 86 and includes a pin cage 113 through which the locking pin 110 extends.

An air diaphragm actuator 114 is mounted on frame 70 as seen in FIG. 12 and has an actuator shaft 116 extending therefrom. The inner end of shaft 116 is pivotally secured to a crank arm 118 by bolt or pin 119. Crank arm 118 is fixedly secured to the shaft 104 as seen in FIG. 12.

The air diaphragm actuator 114 is connected to air tank 80 by suitable piping. A conventional controller (not shown) is connected to air diaphragm 114 for extending and retracting shaft 116. The extension of shaft 116 causes crank arm 118 to rotate in a counterclockwise direction as viewed from the front of the front axle suspension system 64 thereby rotating shaft 104 in the counterclockwise direction. The rotation of shaft 104 in the counterclockwise direction causes links 96 and 106 to be moved inwardly thereby causing the locking pins 90 and 110 to be moved inwardly with respect to pin supports 86 and 112 respectively to an unlocked position. Conversely, the retraction of shaft 116 causes the locking pins 90 and 110 to be moved outwardly from the pin supports 86 and 112 respectively to a locked position.

Front suspension system 64 also includes a pin support 120 at the rearward end of frame 70 rearwardly of pin support 112. Pin support 120 includes a locking pin 122 which is operatively connected to the rearward end of shaft 104 for simultaneous movement with locking pins 90 and 110. Front suspension system 64 also includes a pin support 124 at the rearward end of frame 70 rearwardly of pin support 86. Pin support 124 includes a locking pin 126 which is operatively connected to the rearward end of shaft 104 for simultaneous movement with locking pins 90, 110 and 122.

Figure 7:
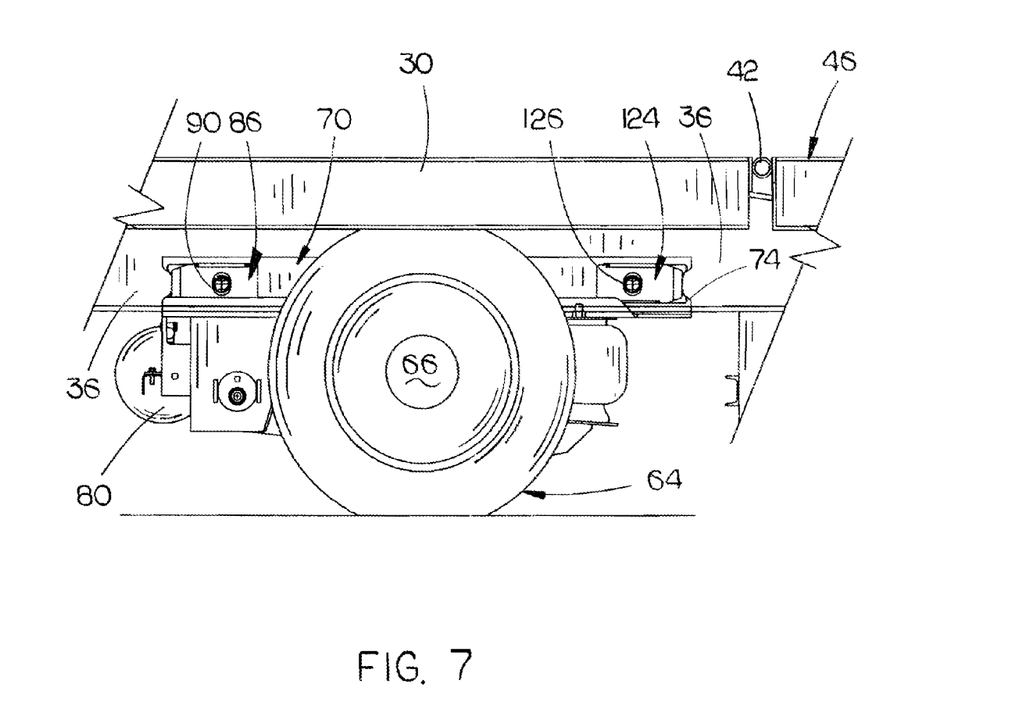
FIG. 7 is an enlarged partial view of the structure of FIG. 6.
Figure 8:
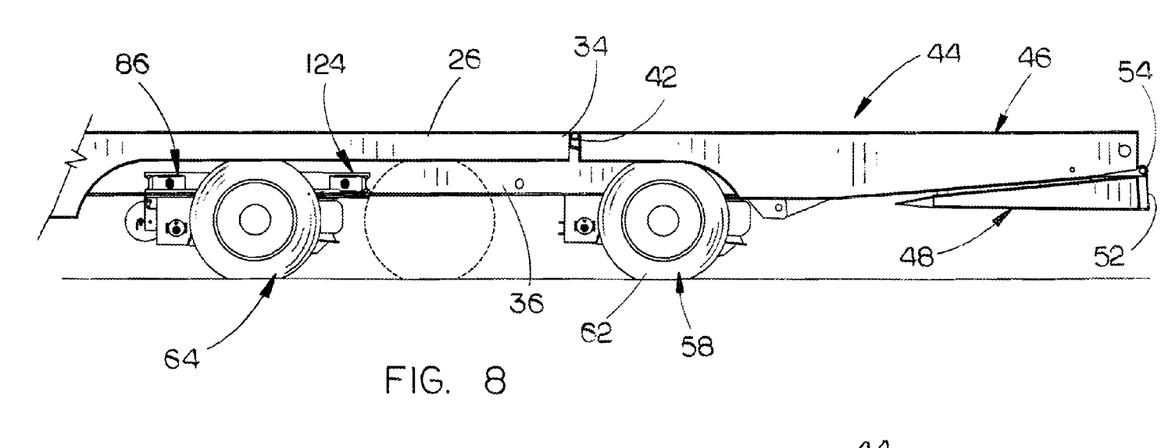
FIG. 8 is a partial side view of the trailer of this invention with the front axle being positioned just rearwardly of its forwardmost position.
Figure 9:
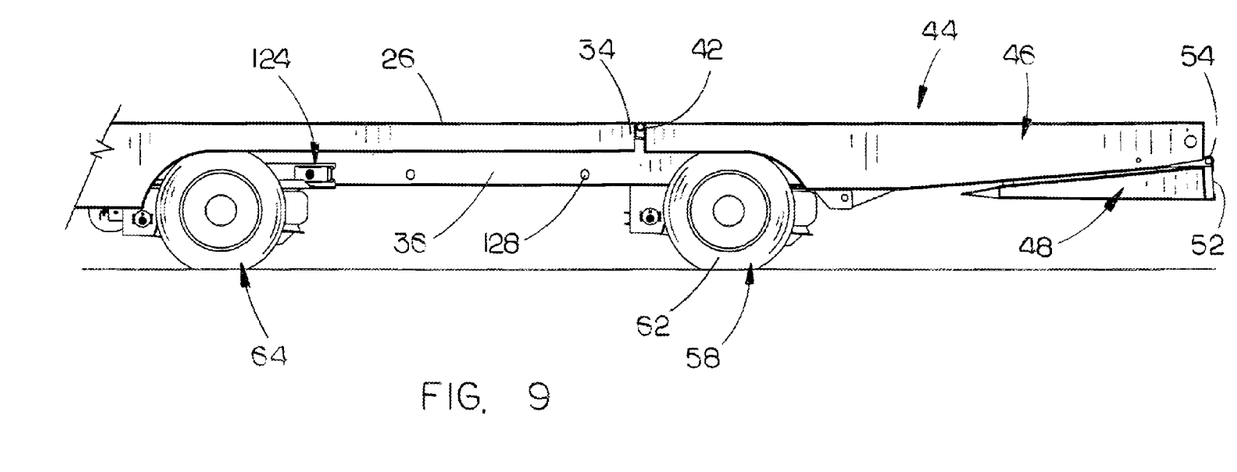
FIG. 9 is a view similar to FIG. 8 except that the front axle has been moved forwardly to its forwardmost position.

The front suspension system 64 is mounted on the trailer frame so that the slider frame members 82 and 84 slidably receive the lower flanges of running gear beams 36 and 37 respectively. When so mounted, the pin supports 86 and 124 will be positioned adjacent the inner side of the web of the running gear beam 36 and the pin supports 112 and 120 will be positioned adjacent the inner side of the web of the running gear beam 37. In the rearwardmost position of FIGS. 1 and 7, the locking pin 126 of pin support 124 will be received by the rearwardmost opening 128 in running gear beam 36 and the locking pin 90 of pin support 86 will be positioned in a forward opening 128. At that same time, locking pins 110 and 122 of pin supports 112 and 120 will be received by openings 130 in running gear beam 37. When it is desired to increase the distance or spread of front suspension system 64 with respect to rear suspension system 58, the air diaphragm actuator 114 will be actuated to withdraw the locking pins from the openings 128 and 130. The brake on the front suspension system 64 will be engaged to lock the wheels thereof. The trailer 10 will then be moved rearwardly by the truck so that the trailer 10 and the rear suspension system 58 are moved rearwardly with respect to the stationary front suspension system 64 until the proper spacing or spread between the front and rear suspension systems has been reached.

The air diaphragm actuator 114 is then operated to move the locking pins 90 and 126 into the proper openings 128 in running gear beam 36 and to simultaneously move the locking pins 110 and 122 into the proper openings 130 in running gear beam 37. As seen, the front suspension system 64 is selectively movable to multiple positions with respect to rear suspension system 58.

As stated above, the legal load limit of the trailer 10 may be increased by increasing the spread of the front and rear axles. The ability to increase the spread of the front and rear axles in combination with the hydraulic tail structure of U.S. Pat. No. 7,547,178 results in a truly unique trailer which represents a distinct improvement in the hydraulic tail trailer art.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A hydraulic tail trailer, comprising:

a main frame having forward and rearward ends;

said main frame including at least first and second longitudinally extending side frame members;

longitudinally extending first and second running gear beams, having forward and rearward ends and upper and lower ends, secured to said main frame in a fixed nonmovable manner;

each of said first and second running gear beams having a rearwardly extending portion which extends rearwardly from said rearward end of said main frame;

each of said first running gear beams having lower horizontally extending flanges;

a rear axle having first and second ends;

wheels secured to said first and second ends of said rear axle;

a rear suspension assembly securing said rear axle to said first and second running gear beams in a fixed position rearwardly of said rearward end of said main frame;

a front suspension system selectively longitudinally movably secured to said first and second running gear beams forwardly of the rearward end of said main frame;

said front suspension system including a front axle having first and second ends with wheels secured to said first and second ends of said front axle;

said front suspension system including a horizontally disposed and generally rectangular frame having a forward end, a rearward end, a first side and a second side;

an elongated and longitudinally extending first slider frame member mounted on said frame of said front suspension system at said first side of said frame of said front suspension system;

an elongated and longitudinally extending second slider frame member mounted on said frame of said front suspension system at said second side of said frame of said front suspension system;

said first and second slider frame members being slidably mounted on said lower flanges of said first and second running gear beams respectively;

means for locking said front suspension system in various longitudinal positions with respect to said first and second running gear beams;

a rear axle brake operatively coupled to said wheels on said rear axle;

a front axle brake operatively coupled to said wheels on said front axle;

said rear axle brake and said front axle brake being independently operable whereby said front axle brake may be engaged without engaging said rear axle brake to enable the trailer, the rear suspension system, the rear axle and the wheels thereon to be moved to multiple positions with respect to said front axle suspension system to increase or decrease the distance between said front axle and said rear axle;

a main deck mounted on said main frame and having forward and rearward ends;

said rearward end of said main deck being positioned forwardly of the centerline of said rear axle;

said rearward end of said main deck being positioned rearwardly of the centerline of said front axle;

a hydraulically operated tail assembly, having forward and rearward ends;

said forward end of said tail assembly being pivotally secured to said main frame at the rearward end thereof;

the pivotal connection of said forward end of said tail assembly to said rearward end of said main frame being positioned forwardly of the centerline of said rear axle; and the pivotal connection of said forward end of said tail assembly to said rearward end of said main frame being positioned rearwardly of said front axle in all of the multiple positions of said front axle.

* * * * *